United States Patent [19]

McCord

[11] 3,842,464

[45] Oct. 22, 1974

[54] MEAT TENDERIZING APPARATUS
[75] Inventor: John B. McCord, Evanston, Ill.
[73] Assignee: Hollymatic Corporation, Park Forest, Ill.
[22] Filed: July 18, 1973
[21] Appl. No.: 380,153

[52] U.S. Cl. ................................................. 17/25
[51] Int. Cl. ............................................. A22c 9/00
[58] Field of Search ........................................ 17/25

[56] References Cited
UNITED STATES PATENTS
3,583,025  6/1971  Jaccard ................................. 17/25
3,736,583  5/1973  Smith .................................... 17/25

*Primary Examiner*—Robert Peshock
*Attorney, Agent, or Firm*—Hofgren, Wegner, Allen, Stellman & McCord

[57] ABSTRACT

A meat tenderizing apparatus, particularly but not exclusively for meat that contains bones, in which force yieldable sets each containing a plurality of elongated knives are used so that the stress on each knife is reduced to a safe level. Each knife has a sharp meat penetrating end and each set comprises a shank or piston and a plurality such as a pair of knives mounted on the shank with the knives in each set parallel and closely spaced and with the meat penetrating ends of the knives in each set being adjacent to but separate from each other so that the progress into the meat of the knives is stopped when at least one knife of a set strikes a bone.

5 Claims, 3 Drawing Figures

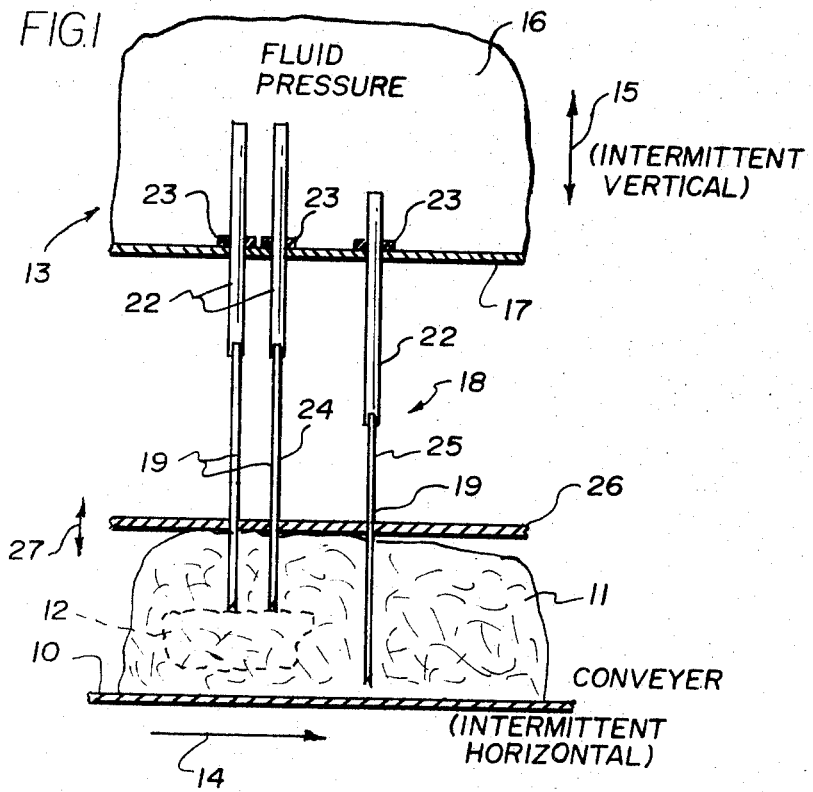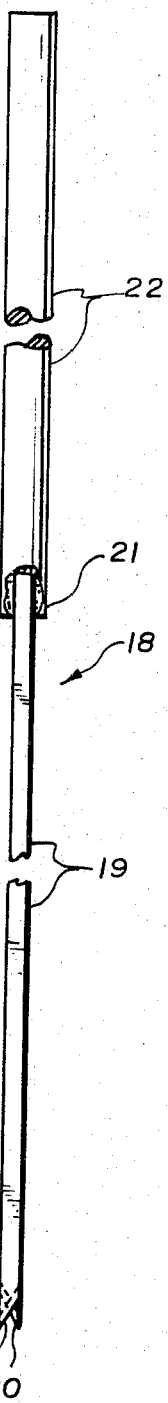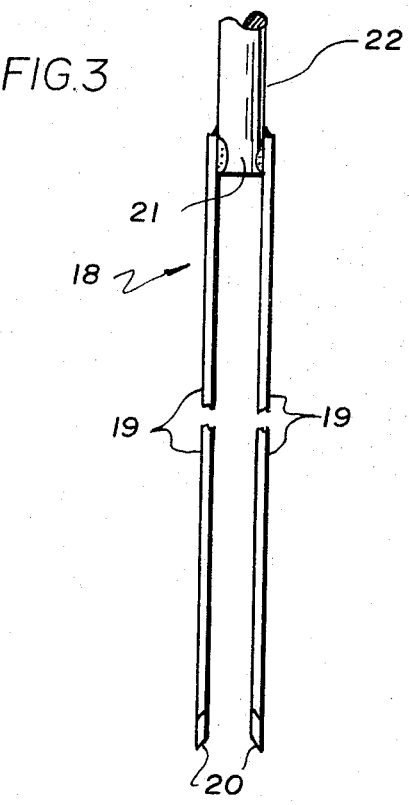

MEAT TENDERIZING APPARATUS

SUMMARY OF THE INVENTION

One of the features of this invention is to provide an improved meat tenderizing apparatus in which the force yieldable knives are arranged in sets of a plurality of knives each with each set of knives forced into the meat by a single force propelled piston.

The most pertinent prior art of which applicant is aware are the following: U.S. Pat. No. 3,535,734 discloses an apparatus having yieldable knives for tenderizing meat but each knife or cutting element of this prior patent is mounted for independent, force limited insertion into the meat rather than as in the present invention having a plurality of knives operated as a unit by a single piston for force limited insertion into the meat. Thus in this prior patent each elongated knife or cutting element is mounted on its own independent shank or piston. U.S. Pat. No. 1,116,668 discloses a plurality of knives or cutting elements provided in each set but each element is short and stubby and functions more to pound or crush rather than to knife or penetrate. Other prior art with force yieldable meat tenderizing elements are U.S. Pat. Nos. 110,111, 2,641,990, 2,796,017, 3,256,801 and 3,381,603, but these also do not disclose the herein claimed invention.

BRIEF DESCRIPTION OF THE DRAWINGS

FIG. 1 is a schematic side elevational view partially broken away of an apparatus embodying the invention.

FIG. 2 is an enlarged side elevational view of a set of tenderizing knives.

FIG. 3 is a side elevational view similar to FIG. 2 but taken at 90° thereto.

DESCRIPTION OF THE PREFERRED EMBODIMENT

In the embodiment illustrated in the accompanying drawings there is provided an intermittently operated meat conveyor 10 which may be of the type shown and described in U.S. Pat. No. 3,334,377 on which meat 11 having a bone illustrated at 12 is conveyed beneath a knife operating head 13. The generally forward movement of the conveyor 10 is indicated by the illustrated arrow 14.

The head 13 is intermittently movable in a vertical direction as indicated by the arrow 15 and in a manner similar to the knife operating head in the above U.S. Pat. No. 3,535,734. This head 13 is provided with an internal fluid pressure as indicated on the interior 16 which is preferably a gas such as air so as to be compressible and thus yieldable. The side 17 of the head 13 facing the conveyor 10 and the meat 11 thereon slidably retains a plurality of knives in a manner as illustrated in the above U.S. Pat. No. 3,535,734. Only three sets are shown here for illustrative purposes.

Each set 18 of knives as is illustrated in FIGS. 2 and 3 comprises a plurality, here shown as two, of elongated thin and narrow knives 19 with each having a sharp meat penetrating edge end 20 at an angle of about 30°, for example, to the vertical. The upper ends of each pair of knives 19 are joined to diametrically opposite sides of a vertical shank or piston 22 on the lower end 21 so that the lower end acts as a yoke separating each pair of knives by the width of the piston 22 lower end 21.

As can be seen, the knives 19 in each set are substantially parallel to each other and are closely spaced but with the meat penetrating ends 20 being adjacent to but separate from each other to operate as separate meat penetrating units.

As can be seen in FIG. 2, the cutting edges which define the meat penetrating ends 20 are sloped for easier meat penetration and the slopes are in directions opposite to each other for each adjacent pair of knives so that upon penetration of the knives in each set into the meat the forces of the sloped edges 20 sliding into the meat which would tend to cause a sideways displacement of the knife set serve to counteract each other with the result that the stroke of the plurality of knives in each set into and out of the meat is smooth, straight and clean.

The shanks 22 are slidably retained in similarly shaped holes in the side or, in this embodiment, the bottom 17 of the head 13 and each shank on the inner surface of the head bottom 17 is provided with a flexible seal 23 to minimize fluid losses between the shanks 22 and the head bottom 17.

Each set 18 of knives is guided for substantially vertical movement by sliding engagement of the knives with guide means shown schematically and including a comb and hold down plate 26 having slots through which the knive blades extend. As is customary, the comb plate 26 travels downwardly with the knife operating head 13 as indicated by the arrow 15 during pause of the conveyor to project the knives into the meat and press the comb against the meat. This contact of the comb 26 with the meat is maintained during withdrawal of the knives, as is customary.

In operation the conveyor 10 is moved intermittently as indicated by the arrow 14 so that the meat illustrated at 11 on the conveyor pauses beneath the tenderizer head 13 in the customary manner as explained above. During this pause the knife head 13, comb plate 26 and the plurality of sets 18 of knives mounted thereon are moved vertically as indicated by the double headed arrow 15 into meat penetrating position as illustrated in FIGS. 1 and 2 and then into raised position where the knives are withdrawn from the meat while the comb plate 26 remains in contact. When the knives and comb have been withdrawn the conveyor 10 is again operated to move the meat 11 forwardly another increment of movement with respect to the knife head 13 in the customary manner. During the meat penetration the penetrating movement, here the downward movement, of each set 18 which contains a plurality of knives each is halted as soon as one knife 24 strikes a bone 12 or other movement retarding object. The remaining sets 18 of knives continue their penetrating movement without the interruption as illustrated by the set 25 in FIG. 2. Then on reverse movement of the knife operating head 13 the knives are withdrawn and then the comb plate in the usual way as illustrated in the above U.S. Pat. No. 3,535,734.

In one embodiment of the invention the knives were arranged in pairs as illustrated in the drawings and the sets of knives penetrated raw meat when the air pressure was about 40 psi. It was also observed that the relatively massive shanks or pistons 22 with respect to the pairs of knives 19 provided a large momentum force so that the inertia of this larger mass which is moving rapidly when the knives strike the meat aided the penetration of the meat even at relatively low fluid pressures. Although it is believed that the greater inertia of the larger mass of the multiple knife set was the cause of this the invention is not limited to this or any other theory.

The multiple knives in each knife set has a number of advantages over the prior art single knife per set. Thus, as stated above, as soon as one knife in each set strikes a bone all knives in that set stop their forward penetration. In addition, where the edges 20 of each knife is sloped as illustrated in FIG. 2 and with the slope of adjacent pairs of knives being in the opposite direction and the sloped edge aids the smooth penetration into the meat and the opposite slopes mean that there is little if any sideways shifting effect as the slope of one knife compensates for the opposite slope of the adjacent knife. Another advantage is that as the knives are arranged in sets of a plurality of knives each they can be located very close together so as to cut the fibers of the meat being tenderized into very short lengths. Thus the spacing of the knives in each set can be made closer than the spacing of adjacent knives were each knife mounted on its own mounting shank.

A very important advantage of the tenderizer of this invention is the considerable saving in cost. By mounting a plurality of knives on each shank rather than each knife requiring its own shank the manufacturing costs are greatly reduced and the expense of providing seals as illustrated at 23 is also greatly reduced.

Another important advantage of this invention is that the shanks or pistons 22 provide a large mass so that the knives are under considerable momentum when the sharp ends 20 of their cutting edges as described contact the meat. The result is that the momentum of this large mass aids the penetration. Thus in one embodiment where the shanks were each 6.25 inches long and 0.28 inch in diameter while each of a pair of knives 19 was 0.042 × 0.125 × 7 inches long the mass of each shank was about 5.2 times the mass of its pair of knives. By providing from three to six times as much mass in the piston as in the combined mass of the plurality of knives attached to the shank or piston the penetration of the meat is smooth and cleaner and there is better balance in each piston and knife set which serves to minimize stresses and reduced the chances of breakage of the knives.

By mounting a plurality of knives, shown here specifically as two, on a single shank-piston the stress on each knife is greatly reduced and therefore the danger of breakage is correspondingly lessened. Prior workers in this art have recognized that tenderizing knives for severing meat fibers without substantially altering the appearance of the meat are "very delicate" with danger of breakage but that the knife cannot be too large in cross section in order to tenderize the meat mechanically "without changing its general shape and appearance." Thus the above cited prior U.S. Pat. No. 3,535,734 discusses this to some length and concludes that a satisfactory knife is one that is 0.1 inch wide and 0.03 inch thick and that requires a force of 2.5–3 pounds "to penetrate and properly sever" the meat fibers.

In this invention, in contrast, by mounting a plurality of blades on a single shank-piston the thickness of a typical knife blade can be increased to 0.042 inch and the width increased to 0.125 inch and by mounting two blades as illustrated on a cylindrical piston of 0.28 inch diameter the air pressure on the interior 16 of the illustrated head 13 may be 40 pounds per square inch gauge so that the force on the piston will be only 1.22 pounds for each knife as contrasted to the prior belief that this force had to be 2.5–3 pounds. Thus the force and resulting stress on each knife is less than one-half the minimum required on the knives where each knife is mounted on its own piston while still achieving excellent tenderizing by severing the fibers of tough meat.

In the embodiment illustrated in the accompanying drawings the comb 26 is customarily held against the meat 11 while the knives 24 are withdrawn almost entirely from the meat 11 after which the comb 26 is raised with the ascending knives into position preparatory to tenderizing the next piece of meat or the next section of the same piece of meat if it is sufficiently long. This intermittent penetration and withdrawal movement of the comb 26 is illustrated by the vertical arrow 27 in FIG. 1. This operation and movement of the comb 26 as well as the knives and the knife operating head 13 as well as the intermittent movement of the conveyor are all conventional in this art and explained above and fully described in the above prior art U.S. Pat. No. 3,535,734.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. A yieldable-knife meat tenderizing apparatus particularly for meat that contains bones, comprising: a plurality of closely spaced, force yieldable sets of elongated knives with each knife having a sharp meat penetrating and meat severing sloped end, each said set comprising a reciprocable piston and a plurality of said knives on the piston with the knives in each set being substantially parallel to each other and to their said piston and with the meat penetrating ends of the knives of each set being adjacent to but separate from each other; and force yieldable means independently retaining each said set of elongated knives in meat penetrating position.

2. The apparatus of claim 1 wherein there are provided a pair of said knives in each said set on diametrically opposite sides of their said piston.

3. The apparatus of claim 1 wherein said force yieldable means comprises pneumatic pressure means for acting against said piston.

4. The apparatus of claim 3 wherein said pneumatic pressure means is substantially equivalent in force to about 40 pounds per square inch gauge on a said piston of about 0.28 inch diameter.

5. The apparatus of claim 1 wherein the ends of the knives in each said set are substantially transversely aligned for simultaneous penetration of said meat.

* * * * *